(12) United States Patent
Chan et al.

(10) Patent No.: US 7,397,383 B2
(45) Date of Patent: Jul. 8, 2008

(54) REMOTE MONITORING METHOD WITH EVENT-TRIGGERED WARNING CAPABILITY

(75) Inventors: Sen-Ta Chan, Taipei Hsien (TW); Yi-Chang Wu, Taipei Hsien (TW); Yi-Hsun Chen, Taipei Hsien (TW); Kun-Chang Chen, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 206 days.

(21) Appl. No.: 11/383,226

(22) Filed: May 15, 2006

(65) Prior Publication Data
US 2007/0222628 A1 Sep. 27, 2007

(30) Foreign Application Priority Data
Mar. 24, 2006 (TW) .............................. 95110353 A

(51) Int. Cl.
*G08B 21/00* (2006.01)

(52) U.S. Cl. ..................... 340/635; 340/691.6; 709/224

(58) Field of Classification Search ................. 340/635, 340/506, 524, 691.6; 709/224; 324/555, 324/556
See application file for complete search history.

(56) References Cited

U.S. PATENT DOCUMENTS

| 6,262,669 B1 * | 7/2001 | Leu .............................. 340/635 |
| 7,020,701 B1 * | 3/2006 | Gelvin et al. ................ 709/224 |
| 2003/0172150 A1 * | 9/2003 | Kennedy ..................... 709/224 |
| 2004/0030778 A1 * | 2/2004 | Kronenberg et al. ......... 709/224 |
| 2004/0158627 A1 * | 8/2004 | Thornton ..................... 709/224 |

* cited by examiner

*Primary Examiner*—Phung Nguyen
(74) *Attorney, Agent, or Firm*—Winston Hsu

(57) ABSTRACT

A remote monitoring method includes monitoring a plurality of components on a main board. When one of the plurality of components fails to function properly, a warning message is produced to indicate that the component is out of order. Afterward, the warning message is transmitted to a remote control device through a network medium. The remote control device then produces a plot to imitate the relative positions of the main board and the components and displays the malfunctioning component on the plot.

14 Claims, 2 Drawing Sheets

REMOTE MONITORING METHOD WITH EVENT-TRIGGERED WARNING CAPABILITY

BACKGROUND OF THE INVENTION

1. Field of the Invention

The present invention relates to a remote monitoring method, and more specifically, to a remote monitoring method with event-triggered warning capability.

2. Description of the Prior Art

For helping maintenance workers manage and maintain electronic devices efficiently, there are usually some detectors installed on the electronic devices to monitor functional statuses of the electronic devices. Even so, the maintenance workers still have to face more challenges when technology changes with every passing day. For example, every maintenance worker may need to monitor a plurality of devices located in different engine rooms or distributed in different zones. In addition, maintaining the devices of different types is also a challenge for the maintenance workers.

In some previous monitoring methods, functional statuses of the devices are only displayed on a monitored device interface. For example, functional statuses of components on a main board are displayed with lamp signals. However, it is not only time-consuming but also inefficient because the maintenance workers have to check the detailed functional statuses by themselves. These methods are also not fit for some electronic devices without interfaces. In addition, displaying error messages also raises power problems if the maintenance workers need to cut off a power supply.

In other previous monitoring methods, there is a monitoring device installed on a monitored device for monitoring functional statuses of the monitored device. Then the maintenance workers look up the functional statuses of the monitored device and error messages through the monitoring device. However, it is still time-consuming and inefficient because the maintenance workers need to do it by themselves.

SUMMARY OF THE INVENTION

According to the claimed invention, a remote monitoring method comprises monitoring a plurality of components on a main board and producing a warning message to represent that a component of the plurality of components is out of order when one of the plurality of components fails to function properly. The warning message is transmitted to a remote control device through a network medium. The remote control device then produces a plot to imitate a relative position of the main board and the plurality of components and indicates an error message on the plot to represent the component is out of order.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
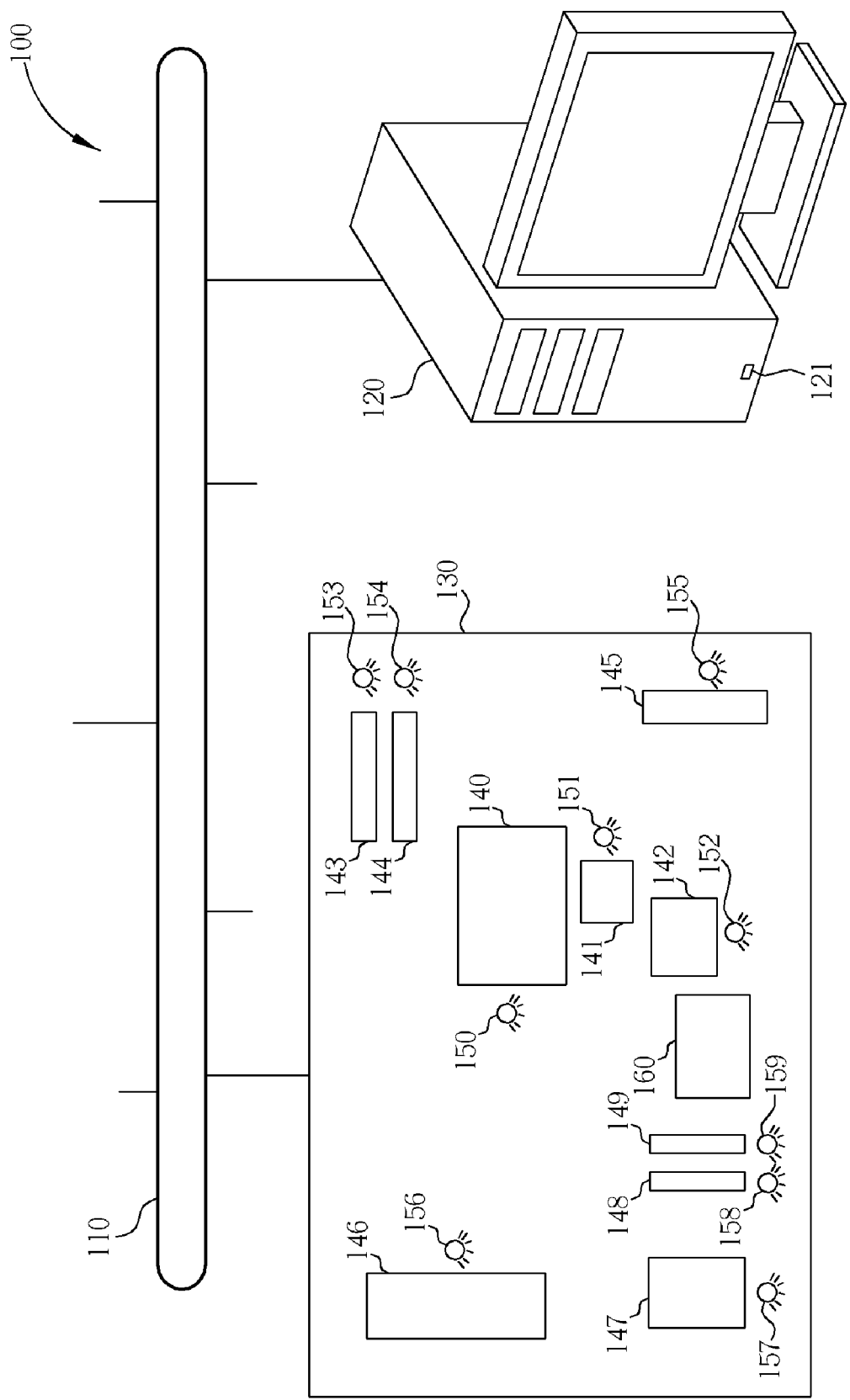
FIG. 1 is a functional block diagram of a remote monitoring system according to the present invention.

Please refer to FIG. 1. FIG. 1 is a functional block diagram of a system 100 according to the present invention. The system 100 comprises a network medium 110, a remote control device 120, a main board 130, and a supervisory control apparatus 160. The remote control device comprises a buzzer 121 for producing a warning buzz. The main board 130 is a monitored device according to the present invention. The main board 130 comprises a CPU 140, a north bridge chip 141, a south bridge chip 142, two memory slots 143 and 144, a disk interface 145, a serial I/O interface 146, a display chip 147, and two peripheral component interconnection (PCI) interfaces 148 and 149. Components on the main board are not limited to components mentioned above. The supervisory control apparatus 160 comprises a detector 150 for monitoring the CPU 140, a detector 151 for monitoring the north bridge chip 141, a detector 152 for the south bridge chip 142, and seven other detectors 153-159 for monitoring functional statuses of components 143-149 respectively. When one of components 140-149 fails to function properly, the supervisory control apparatus 160 will receive a warning message produced by a corresponding detector 150-159. Then the supervisory control apparatus 160 will transmit a warning message to the remote control device 120.

In the present invention, a maintenance worker also can send out an inquiry command actively to the supervisory control apparatus 160 through the remote control device 120 for receiving the functional statuses of the components 140-149 on the main board 120. Similarly, the remote control device 120 can send out inquiry commands to the supervisory control apparatus 160 regularly or irregularly for receiving the functional statuses of the components 140-149. Likewise the supervisory control apparatus 160 can transmit warning messages to the remote control device 120 automatically without the requests of the remote control device 120. The remote control device 120 utilizes the warning messages transmitted by the supervisory control apparatus 160 to form words or images representing the components 140-149 and the main board 130 in a plot to indicate system errors. The images in the plot are displayed according to the relative positions of the components 140-149 and the main board 130 to imitate the main board 130 and the components 140-149. When there is a malfunctioning component 140-149 on the main board 130, the remote control device 120 will display the image of the malfunctioning component in a manner different from other components to notify the maintenance worker which is the malfunctioning component 140-149. For example, the first method is that the remote control device 120 displays only the images respectively representing the main board and the malfunctioning component 140-149 on the plot. The second method is that the remote control device 120 flashes the image representing the malfunctioning component 140-149 on the plot while images representing other components are not flashing. The third method is that the remote control device 120 displays the image representing the malfunctioning component 140-149 with a color different from images representing other components on the plot. Therefore, it saves time spent by the maintenance worker to be familiar with devices of different types because the maintenance worker can find out the malfunctioning component quickly according to indications mentioned above. In addition to the aforementioned notification, there are several ways to further notify the maintenance worker to check out the remote control device 120 when a system error occurs, such as sending out a warning buzz by the buzzer 121 or producing a short message by the remote control device 120. Thus the maintenance worker can respond to the system error as soon as the system error occurs. The network medium 110 can be a wired network, a wireless network, and/or so on while using the network medium 110 to transmit messages between the remote control device 120 and the supervisory control apparatus 160 or from the remote control device 120 to the maintenance worker.

Figure 2:
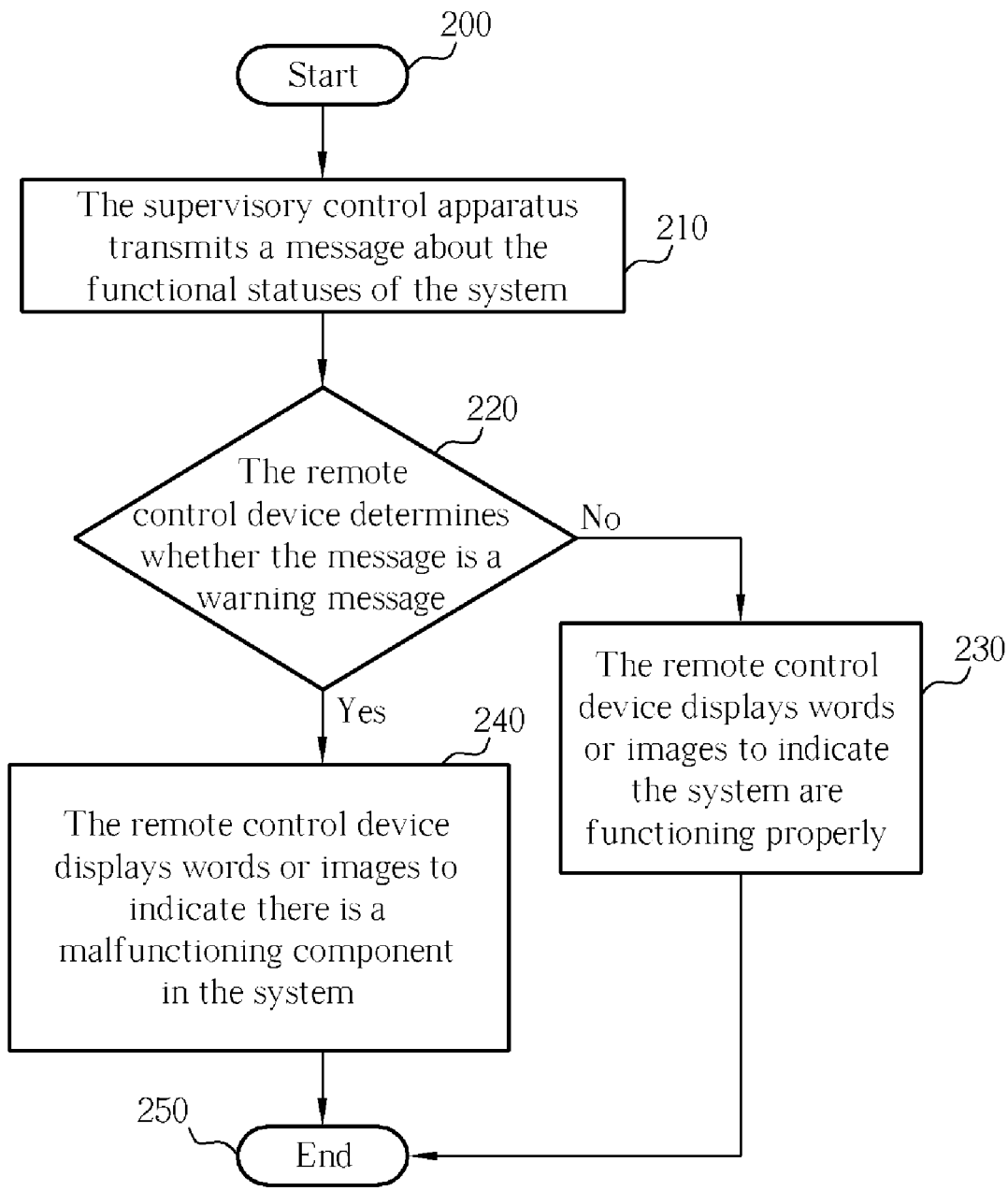
FIG. 2 is a flowchart of a method of remote monitoring according to the present invention.

Please refer to FIG. 2. FIG. 2 is a flowchart of a method according to the present invention. The method comprises the following steps.

Step 200: start.

Step 210: the supervisory control apparatus 160 automatically transmits a message about the functional statuses of the components 140-149 on the main board 130, or transmits a message about the functional statuses of the components 140-149 on the main board 130 in response to an inquiry command from the remote control device 120. The message is transmitted from the supervisory control apparatus 160 to the remote control device 120 through a network medium.

Step 220: the remote control device 120 determines whether the message about the functional statuses of the components 140-149 on the main board 130 is a warning message to indicate there is a malfunctioning component 140-149 on the main board 130. If there is a malfunctioning component 140-149, go to Step 240, else go to Step 230.

Step 230: if all of the components 140-149 are functioning properly, the remote control device 120 will display words or images on the remote device 120 to indicate that the components 140-149 are functioning properly. Go to Step 250.

Step 240: if at least one of the components 140-149 is malfunctioning, the remote control device 120 will utilize the message transmitted by the supervisory control apparatus 160 to form words or images representing the components 140-149 and the main board 130 in a plot to indicate system errors.

Step 250: end.

The invention comprises not only looking up functional statuses of each electronic device through the remote control device 120 but also receiving a warning message transmitted immediately and automatically from the supervisory control apparatus 160 when there is a malfunctioning component on the electronic device. Then the remote control device 120 will display information thereof to help the maintenance worker find out the malfunctioning component quickly. In addition, using the remote control device 120 to look up functional statuses of each electronic device through the network medium increases searching speed and numbers of monitored devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A remote monitoring method comprising:
  monitoring a plurality of components on a main board;
  when one of the plurality of components fails to function properly, producing a warning message to indicate that the component is out of order;
  transmitting the warning message to a remote control device through a network medium;
  the remote control device producing images on a plot to imitate a relative position of the main board and the plurality of components according to positions of the plurality of components on the main board; and
  displaying an error message on the plot to indicate that the component is out of order.

2. The method of claim 1, wherein displaying the error message on the plot to indicate that the component is out of order comprises displaying an image representing the component in a specific way different from images representing other components on the plot.

3. The method of claim 2, wherein displaying the image representing the component in the specific way different from the images representing other components on the plot comprises flashing the image representing the component on the plot while the images representing other components are not flashing.

4. The method of claim 2, wherein displaying the image representing the component in the specific way different from the images representing other components on the plot comprises displaying the image representing the component with a color different from the images representing other components.

5. The method of claim 1, wherein displaying the error message on the plot to indicate that the component is out of order comprises only displaying images respectively representing the main board and the component on the plot.

6. The method of claim 1 further comprising producing a buzz by the remote control device to indicate there is a malfunctioning component on the main board.

7. The method of claim 1 further comprising producing a short message by the remote control device to indicate there is a malfunctioning component on the main board.

8. The method of claim 1 further comprising producing a short message by the remote control device to indicate that the component is out of order.

9. The method of claim 1, wherein transmitting the warning message to the remote control device through the network medium comprises transmitting the warning message to the remote control device through a wireless network medium.

10. The method of claim 1, wherein transmitting the warning message to the remote control device through the network medium comprises transmitting the warning message to the remote control device through a wired network medium.

11. A remote monitoring system comprising:
  a plurality of components on a main board;
  a plurality of detectors for monitoring functional statuses of the plurality of components on the main board;
  a supervisory control apparatus for monitoring states of the plurality of detectors and dispatching messages about the functional statuses of the plurality of components on the main board;
  a network medium for transmitting the messages about the functional statuses of the plurality of components on the main board; and
  a remote control device for receiving the messages about the functional statuses of the plurality of components, producing images on a plot to imitate a relative position of the main board and the plurality of components according to positions of the plurality of components on the main board, and displaying an error message on the plot when a component is out of order.

12. The remote monitoring system of claim 11, wherein the remote control device comprises a buzzer for producing a buzz to indicate there is a malfunctioning component on the main board.

13. The remote monitoring system of claim 11, wherein the network medium is a wireless network medium.

14. The remote monitoring system of claim 11, wherein the network medium is a wired network medium.

* * * * *